US012738596B2

(12) United States Patent
Park et al.

(10) Patent No.: US 12,738,596 B2
(45) Date of Patent: Sep. 15, 2026

(54) SECONDARY BATTERY

(71) Applicant: SK On Co., Ltd., Seoul (KR)

(72) Inventors: Byung Jun Park, Daejeon (KR); Tae Hyun Chang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 630 days.

(21) Appl. No.: 17/890,704

(22) Filed: Aug. 18, 2022

(65) Prior Publication Data

US 2023/0065857 A1 Mar. 2, 2023

(30) Foreign Application Priority Data

Sep. 2, 2021 (KR) ........................ 10-2021-0117245

(51) Int. Cl.
*H01M 50/383* (2021.01)
*H01M 50/204* (2021.01)
*H01M 50/24* (2021.01)

(52) U.S. Cl.
CPC ....... *H01M 50/383* (2021.01); *H01M 50/204* (2021.01); *H01M 50/24* (2021.01)

(58) Field of Classification Search
None
See application file for complete search history.

(56) References Cited

U.S. PATENT DOCUMENTS

2011/0200856 A1* 8/2011 Yasui ................ H01M 10/6552 429/88
2012/0263982 A1* 10/2012 Yasui .................. H01M 10/058 429/61
2016/0099451 A1 4/2016 Mural et al.
2019/0097192 A1 3/2019 Kim et al.
2020/0067045 A1 2/2020 Takano et al.
2020/0303701 A1* 9/2020 Kim .................. H01M 50/3425
2022/0140428 A1 5/2022 Chi et al.

FOREIGN PATENT DOCUMENTS

CN 111668410 A * 9/2020 ............... A62C 3/16
CN 112531246 A 3/2021
DE 102014019075 A1 * 6/2016 .............. B60L 50/64
JP 5594592 B2 9/2014
KR 10-2017-0090261 A 8/2017

(Continued)

OTHER PUBLICATIONS

Machine translation CN111668410A (Year: 2025).*

(Continued)

*Primary Examiner* — Brian R Ohara
*Assistant Examiner* — M. T. Leonard
(74) *Attorney, Agent, or Firm* — IP & T GROUP LLP

(57) ABSTRACT

A battery module includes a battery assembly including a plurality of sub-packing units, the plurality of sub-packing units respectively including a cell housing, at least one battery cell accommodated in an internal space of the cell housing, and at least one vent hole disposed in the cell housing and connecting the internal space to an outside of the cell housing, and a flame blocking structure coupled to the battery assembly, and including an inlet hole connected to the vent hole, an inner chamber communicating with the inlet hole, an outlet hole communicating with the inner chamber and the outside, and at least one partition wall protruding into the inner chamber.

17 Claims, 10 Drawing Sheets

(56) References Cited

FOREIGN PATENT DOCUMENTS

| | | | |
|---|---|---|---|
| KR | 10-2018-0024860 | A | 3/2018 |
| KR | 10-2018-0113855 | A | 10/2018 |
| KR | 10-2019-0036260 | A | 4/2019 |
| KR | 10-2020-0112246 | A | 10/2020 |
| WO | 2018/123573 | A1 | 7/2018 |

OTHER PUBLICATIONS

DE_102014019075A1 machine translation (Year: 2026).*

Extended European Search Report for the European Patent Application No. 22191981.4 issued by the European Patent Office on Mar. 6, 2023.

Office Action for Korean Patent Application No. 10-2021-0117245 issued by the Korean Intellectual Property Office (KIPO) on Feb. 19, 2025.

Extended European Search Report for European Patent Application No. 26168299.1 issued by the European Patent Office on Jun. 26, 2026.

* cited by examiner

SECONDARY BATTERY

CROSS-REFERENCE TO RELATED APPLICATION(S)

This application claims benefit of priority to Korean Patent Application No. 10-2021-0117245 filed on Sep. 2, 2021 in the Korean Intellectual Property Office, the disclosure of which is incorporated herein by reference in its entirety.

BACKGROUND

1. Field

The present disclosure relates to a secondary battery.

2. Description of Related Art

As technological development of, and demand for, mobile devices, electric vehicles, energy storage systems (ESS) and the like increase, demand for secondary battery cells as an energy source is rapidly increasing. A secondary battery cell is a battery capable of repeated charging and discharging, because mutual conversion between chemical energy and electrical energy is reversible.

The secondary battery cell includes an electrode assembly of a positive electrode, a negative electrode, a separator, an electrolyte and the like, which are main components of a secondary battery, and a cell body member of a laminated film case protecting the electrode assembly.

However, such an electrode assembly generates heat while undergoing charging and discharging, and the temperature rise due to such heat deteriorates the performance of the secondary battery cell.

In addition, when such heat is severe, the internal pressure of the secondary battery cell increases, causing a problem in which the secondary battery cell is ignited. Moreover, when a plurality of secondary battery cells are mounted, such as in an energy storage system (ESS), the secondary battery cell may explode with such ignition, and flames propagating to other secondary battery cells in the vicinity may also occur.

In detail, one important issue in relation to the safety of the battery pack is direct exposure to flames. In the case of a battery pack, it is a top priority to prevent a fire from occurring inside, but in some cases, a fire may occur inside the battery pack. At this time, when a large amount of flames or high-temperature gas is exposed to the outside of the battery pack, the exposed flames or high-temperature gas may destroy or damage other components around the battery pack and also lead to secondary ignition. In detail, when a fire occurs inside a battery pack mounted on a vehicle, the generated fire may become a very dangerous factor for occupants. Moreover, when the battery pack is installed in a hybrid vehicle or the vehicle collides with another vehicle, exposure to flames or hot gas in the fuel storage tank may cause the fuel to explode, which may lead to a serious accident.

In the case of an energy storage system, a plurality of battery modules may be accommodated in one container, and in this case, if a problem occurs in one battery module and a flame is ejected, the fire may spread to other battery modules, which may lead to a significantly large fire.

SUMMARY

An aspect of the present disclosure is to provide a secondary battery in which flames, transferred to other battery modules, may be prevented by preventing flames from being ejected to the outside of a battery module even when the flames are ejected from the battery cell inside the battery module, and damage to surrounding objects or the human body due to thermal runaway of the battery module may be prevented.

According to an aspect of the present disclosure, a battery module includes a battery assembly including a plurality of sub-packing units, the plurality of sub-packing units respectively including a cell housing, at least one battery cell accommodated in an internal space of the cell housing, and at least one vent hole disposed in the cell housing and connecting the internal space to an outside of the cell housing; and a flame blocking structure coupled to the battery assembly, and including an inlet hole connected to the vent hole, an inner chamber communicating with the inlet hole, an outlet hole communicating with the inner chamber and the outside, and at least one partition wall protruding into the inner chamber.

The at least one partition wall may be configured such that gas or a flame ejected from the inlet hole bypasses the at least one partition wall and exit to the outlet hole.

The inlet hole may be opened in a first direction toward the inner chamber, and the outlet hole may be opened from the inner chamber in a second direction, intersecting the first direction.

The at least one partition wall may at least partially overlap the outlet hole in the second direction.

The at least one partition wall may be disposed in a flow path between the inlet hole and the outlet hole, and extends in the first direction.

The flame blocking structure may be sealingly coupled to the battery assembly, and the at least one vent hole may communicate with the inner chamber through the inlet hole.

The flame blocking structure may include a flame guiding part sealingly coupled to one side of the battery assembly and including the inlet hole, and a flame blocking part coupled to the flame guiding part to define the internal chamber and including the outlet hole.

The at least one vent hole may be formed in a side surface of the battery assembly, the flame guiding part may include a first base plate covering the side surface, and the inlet hole may penetrate through a portion corresponding to the at least one vent hole of the first base plate.

The flame guiding part may include a pipe defining the inlet hole and further protruding from the first base plate toward the inner chamber.

The flame blocking part may include a second base plate spaced apart from the first base plate, and an extension portion extending from an end of the second base plate to the first base plate and defining the outlet hole.

The at least one partition wall may extend from the second base plate to the first base plate and may include a first partition wall disposed between the inlet hole and the outlet hole.

The flame guiding part may include a pipe defining the inlet hole and further protruding from the first base plate toward the inner chamber, and the first partition wall may extend closer to the first base plate than an opening of the pipe in an inner chamber side.

The flame guiding part may include a second partition wall extending from the first base plate to the second base plate and disposed between the extension portion and the first partition wall.

The second partition wall may extend closer to the second base plate than an end of the first partition wall.

The inlet hole may include a first inlet hole and a second inlet hole, and the at least one partition wall may include a third partition wall disposed between the first inlet hole and the second inlet hole.

The internal space of the cell housing may include a first cell accommodating portion accommodating at least one battery cell and a second cell accommodating portion separated from the first cell accommodating portion and accommodating at least one battery cell, the vent hole may include a first vent hole communicating with the first cell accommodating portion and a second vent hole communicating with the second cell accommodating portion, the first inlet hole may communicate with the first vent hole, and the second inlet hole may communicate with the second vent hole.

The flame blocking structure may include a cover configured to selectively open or close the inlet hole.

A volume of the inner chamber may be 1.5 to 2.5 times a volume of one of the at least one battery cell accommodated in the plurality of sub-packing units.

A size of the outlet hole may be 2 to 4 times a size of one of the at least one vent hole.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
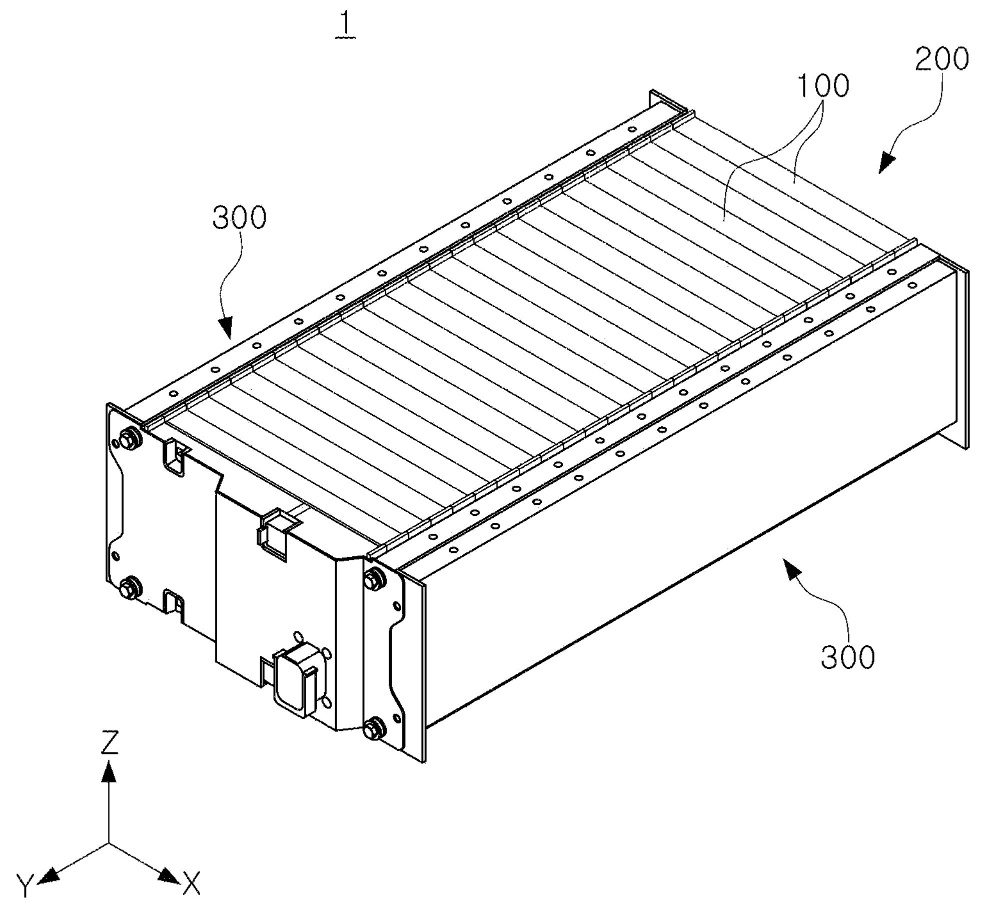
FIG. 1 is an example of a battery module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least an embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device.

The terminology used herein is for describing various examples only, and is not to be used to limit the disclosure. The articles "a," "an," and "the" are intended to include the plural forms as well, unless the context clearly indicates otherwise. For example, assuming that the first member is disposed on a frame in some embodiments, the embodiment is not limited to disposing only one first member on the frame unless otherwise described, and it should be understood that this also includes two or more first members disposed on the frame.

The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

In this specification, the X-direction, Y-direction, and Z-direction mean a direction parallel to the X-axis, a direction parallel to the Y-axis, and a direction parallel to the Z-axis illustrated in the drawings, respectively. In addition, unless otherwise described, the X-direction is a concept including both the +X-axis direction and the −X-axis direction, and this is also applied to the Y-direction and the Z-direction.

When two directions (or axes) are parallel to or perpendicular to each other in this specification, it also includes cases in which the two directions (or axes) are substantially parallel to each other. For example, when the first axis and the second axis are perpendicular to each other, it means that the first axis and the second axis form. 90 degrees or an angle close to 90 degrees.

Paragraphs beginning with "in an embodiment" in this specification do not necessarily refer to the same embodiments. The particular features, structures, or characteristics may be combined in any suitable manner consistent with the present disclosure.

In this specification, "configured to" means that a component includes a structure necessary to implement a certain function.

Hereinafter, an embodiment of the present disclosure will be described in detail with reference to the drawings. However, the spirit of the present disclosure is not limited to the presented embodiment. For example, those skilled in the art who understand the spirit of the present disclosure will be able to propose other embodiments included within the scope of the present disclosure through addition, change or deletion of components, or the like, and this will also be included within the scope of the spirit of the present disclosure.

Figure 2:
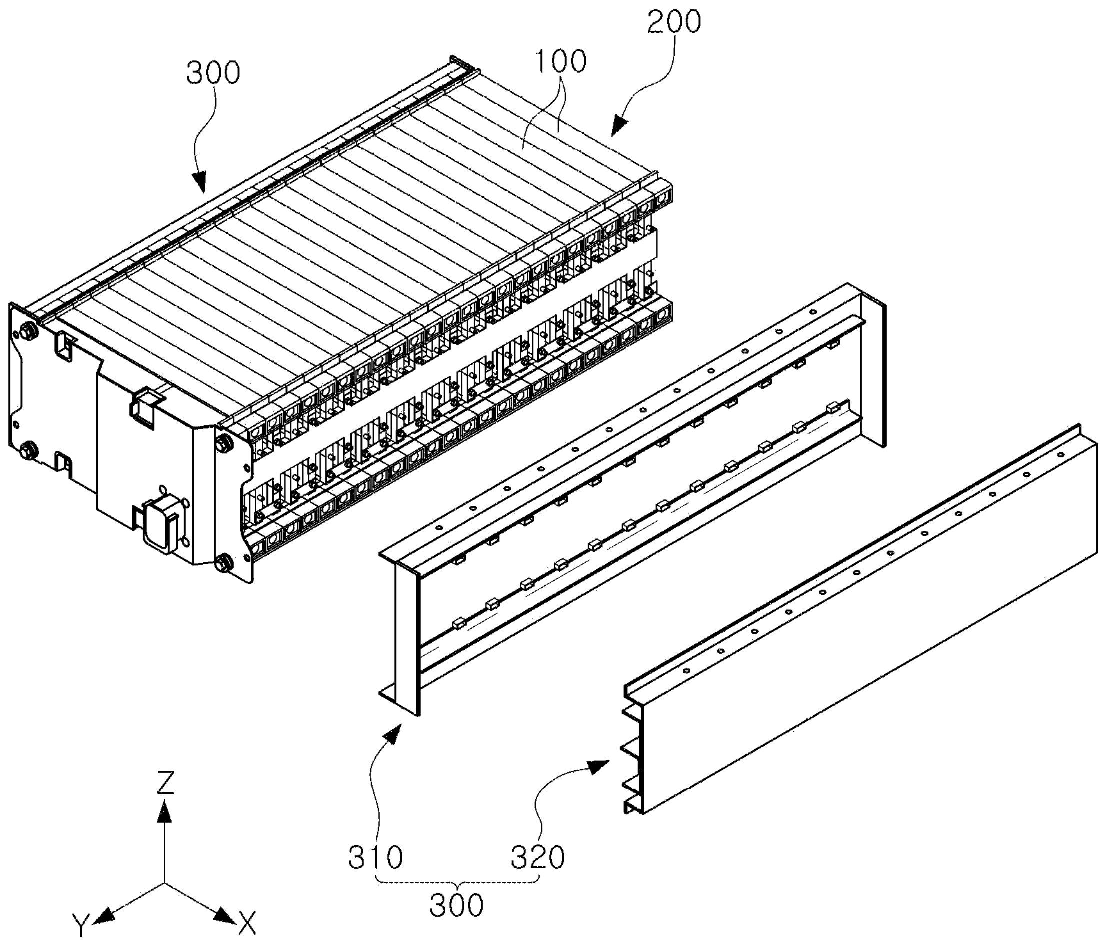
FIG. 2 is an exploded perspective view of a flame blocking structure according to an embodiment.

FIG. 1 is an example of a battery module 1 according to an embodiment. FIG. 2 is an exploded perspective view of a flame blocking structure 300 according to an embodiment.

Referring to FIGS. 1 and 2, the battery module 1 includes a battery assembly 200 including a plurality of battery cells and a housing accommodating the plurality of battery cells. One or more battery cells may be accommodated in a cell housing to be modularized into one sub-packing unit 100, and a plurality of sub-packing units 100 may configure the battery assembly 200.

The battery module 1 may include a flame blocking structure 300 mounted on the battery assembly 200. The flame blocking structure 300 may be mounted on one side surface (the side in the +X direction or the side in the −X direction) of the battery assembly 200, and may be configured such that the flame ejected from the battery assembly 200 is not exposed to the outside of the battery module 1. Referring to FIG. 2, the flame blocking structure 300 may include a flame guiding part 310 and a flame blocking part 320. The flame guiding part 310 and the flame blocking part 320 include an inlet hole 311 and an outlet hole 321, respectively. The gas ejected from the battery assembly 200 may be introduced into the space between the flame guiding part 310 and the flame blocking part 320 through the inlet hole 311, and may exit through the outlet hole 321.

Figure 3:
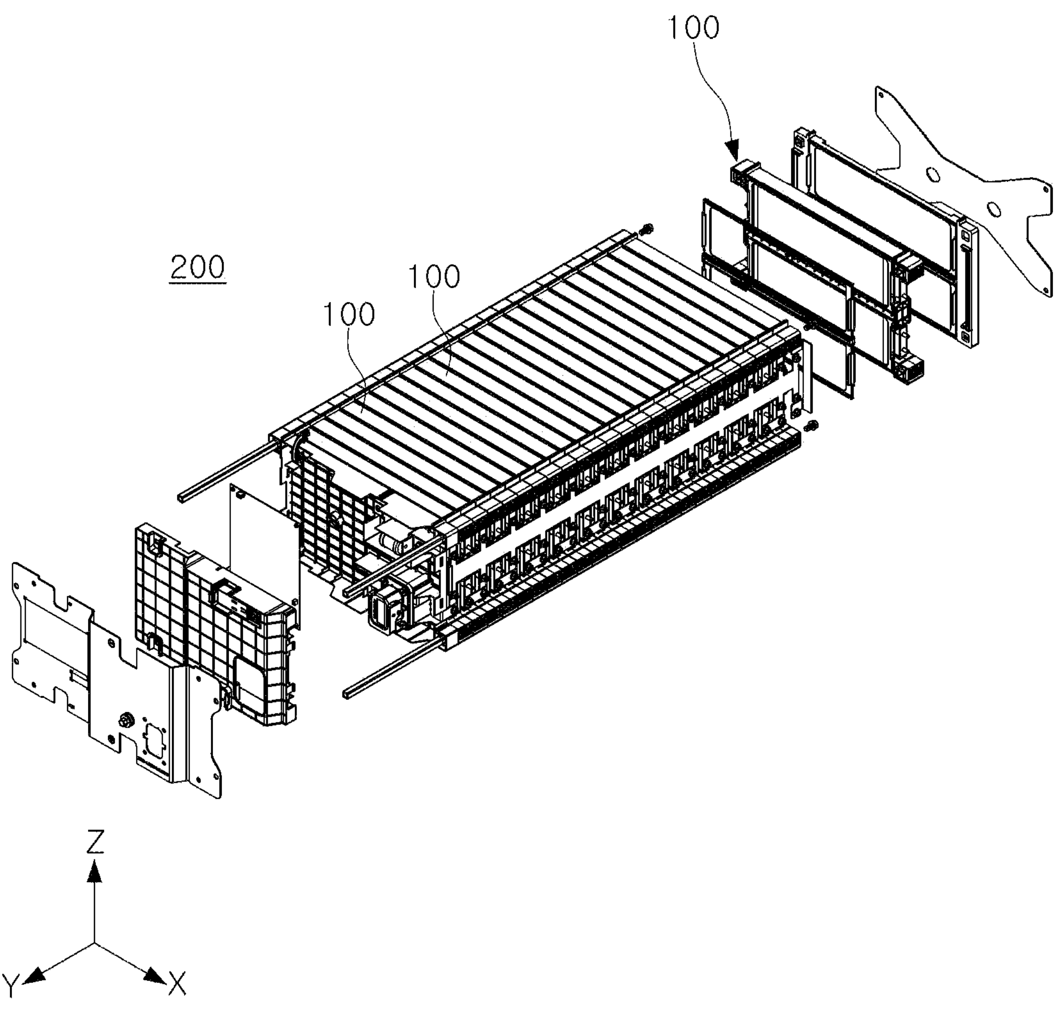
FIG. 3 is an example of a battery assembly according to an embodiment.
Figure 4:
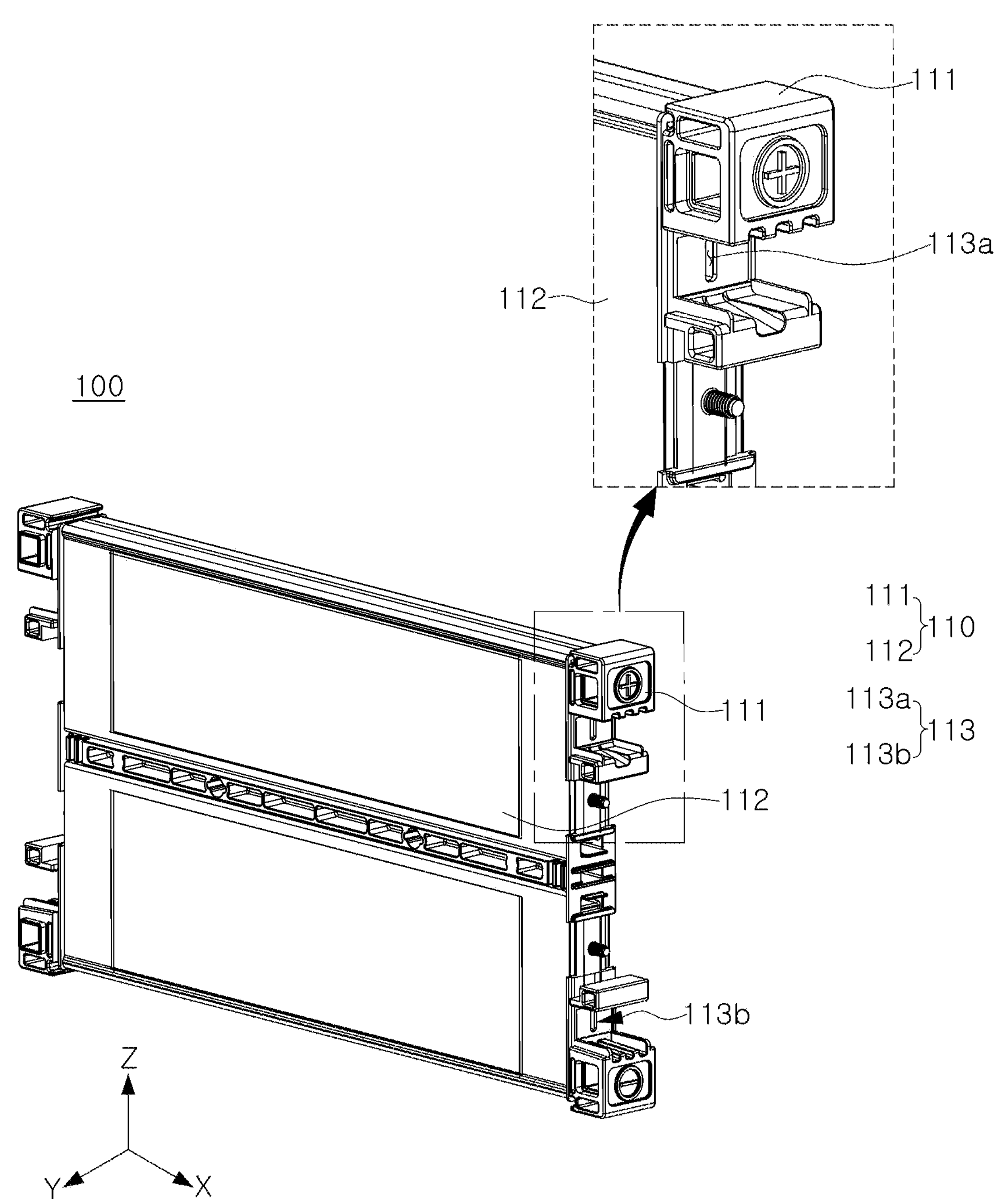
FIG. 4 is an example of a sub-packing unit according to an embodiment.
Figure 5:
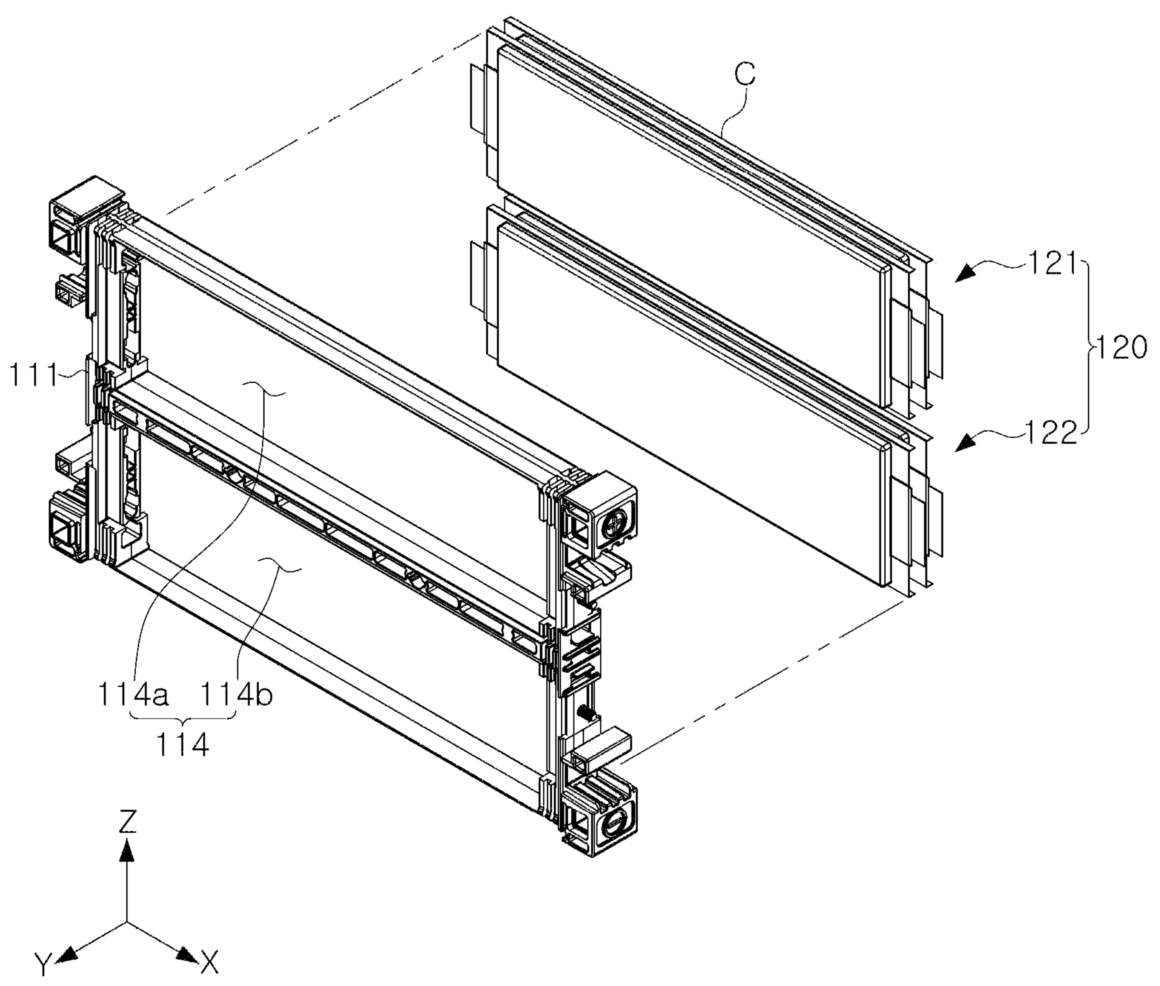
FIG. 5 is an example of a support member of a sub-packing unit and a battery cell accommodated in the support member, according to an embodiment.
Figure 6:
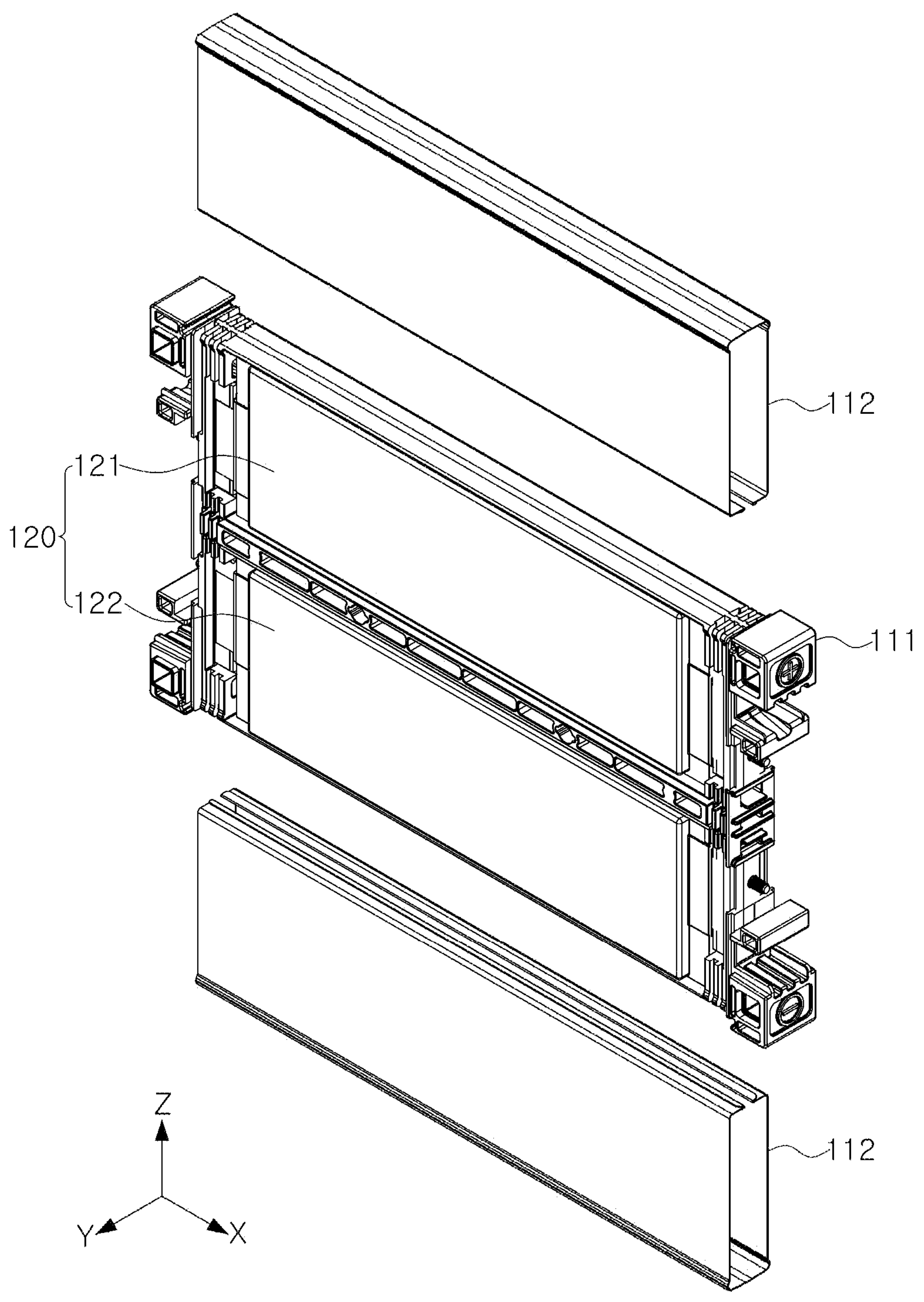
FIG. 6 is an example of a metal case surrounding both sides of a battery cell in a sub-packing unit according to an embodiment.

FIG. 3 is an example of the battery assembly 200 according to an embodiment. FIG. 4 is an example of the sub-packing unit 100 according to an embodiment. FIG. 5 is an example of a support member of the sub-packing unit 100 and a battery cell accommodated in the support member according to an embodiment. FIG. 6 is an example of a metal case surrounding both sides of a battery cell in the sub-packing unit 100 according to an embodiment. Hereinafter, the examples will be described with reference to FIGS. 3 to 6.

The battery assembly 200 may include the plurality of sub-packing units 100 and a fastening structure for fixedly coupling the sub-packing units to each other. The battery assembly 200 may further include components other than configurations described in this specification.

The sub-packing unit 100 may include at least one battery cell 120 and a cell housing 110 accommodating the at least one battery cell 120. The battery cell 120 may include electrode plates coated with an active material, an electrode assembly including separators disposed between the electrode plates, and a film case surrounding the electrode assembly. In the drawings of this specification, the battery cell 120 is illustrated in the form of a pouch, but the embodiment of the present disclosure is not limited thereto, and in another embodiment, the battery cell 120 may have a prismatic shape or a cylindrical shape.

The cell housing 110 includes a support member 111 configured to accommodate at least one battery cell 120, and a case 112 surrounding both surfaces of the at least one battery cell 120. At least one battery cell 120 is housed by the support member 111 and the case 112 to be protected from external shocks, foreign substances or the like.

For example, the support member 111 defines a cell accommodating portion 114, and the cell accommodating portion 114 is open in both directions. Referring to FIG. 5, the support member 111 may include an upper cell accommodating portion **114*a* and a lower cell accommodating portion 114*b* spatially separated from the upper cell accommodating portion 114*a*. At least one battery cell 120 may be accommodated in the upper cell accommodating portion 114*a* and the lower cell accommodating portion 114*b*, respectively. For example, an upper battery cell 121 may be accommodated in the upper cell accommodating portion 114*a*, and a lower battery cell 122 may be accommodated in the lower cell accommodating portion 114*b***.

After at least one battery cell 120 is accommodated in the cell accommodating portion 114, the case 112 is coupled to the support member 111 to surround at least one battery cell 120. The case 112 may be configured to press the battery cell 120 inwardly. Referring to FIG. 6, the case 112 may be provided in a 'C' shape.

In an embodiment, the cell housing 110 may include at least one vent hole 113. The gas or flame ejected from the battery cell 120 may be discharged through the vent hole 113 of the cell housing 110. For example, the support member 111 may define at least one vent hole 113. When the case 112 is assembled to the support member 111, the cell accommodating portion 114 of the support member 111 may be sealed or substantially sealed. Accordingly, the gas or flame ejected from the battery cell 120 is guided to escape through the vent hole 113 formed in the support member 111.

In an embodiment, the cell housing 110 may include a first vent hole 113*a* communicating with the upper cell accommodating portion 114*a* and a second vent hole 113*b* communicating with the lower cell accommodating portion 114*b*.

Figure 7:
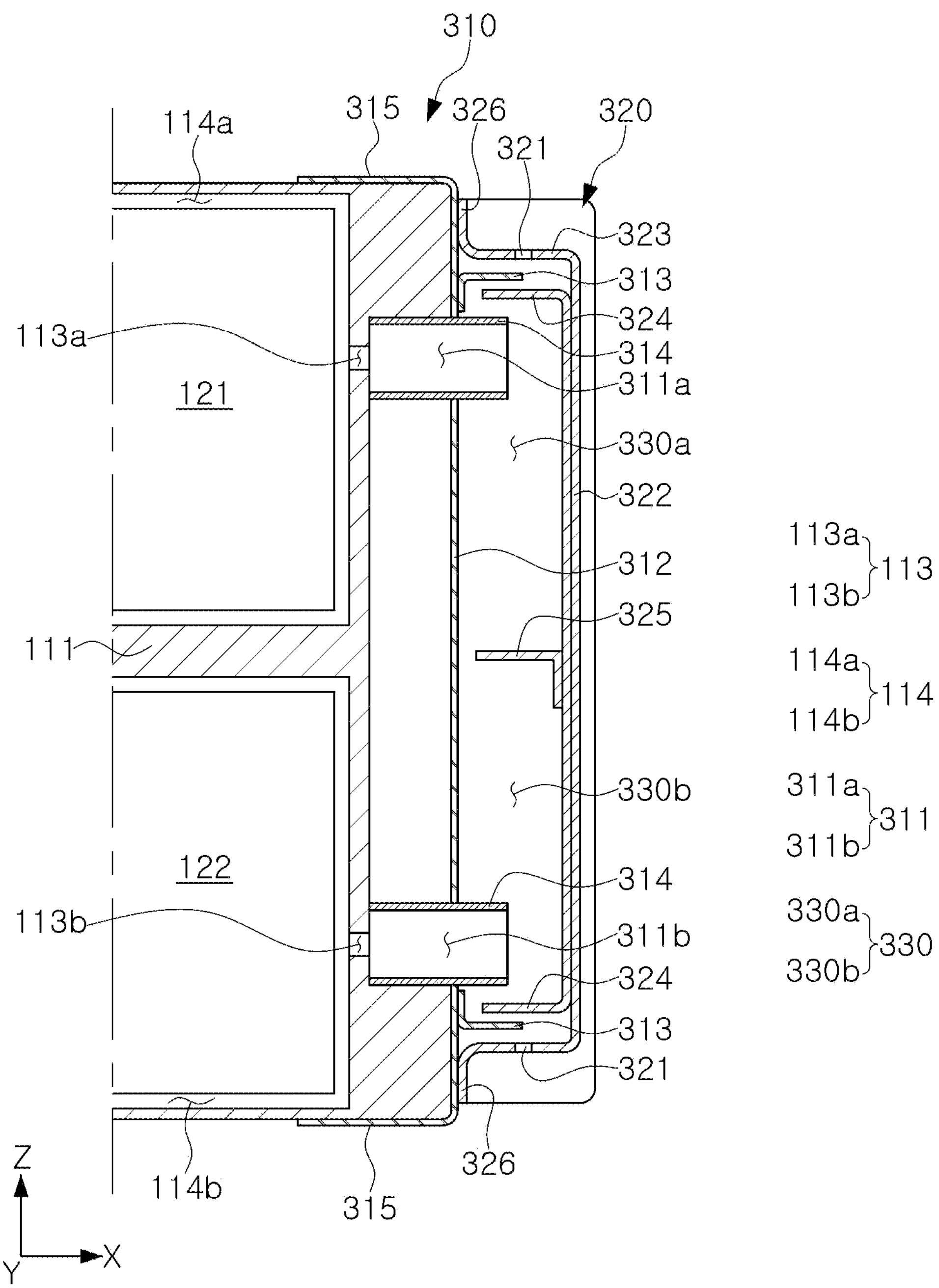
FIG. 7 is a cross-sectional view of a flame blocking structure according to an embodiment.
Figure 8:
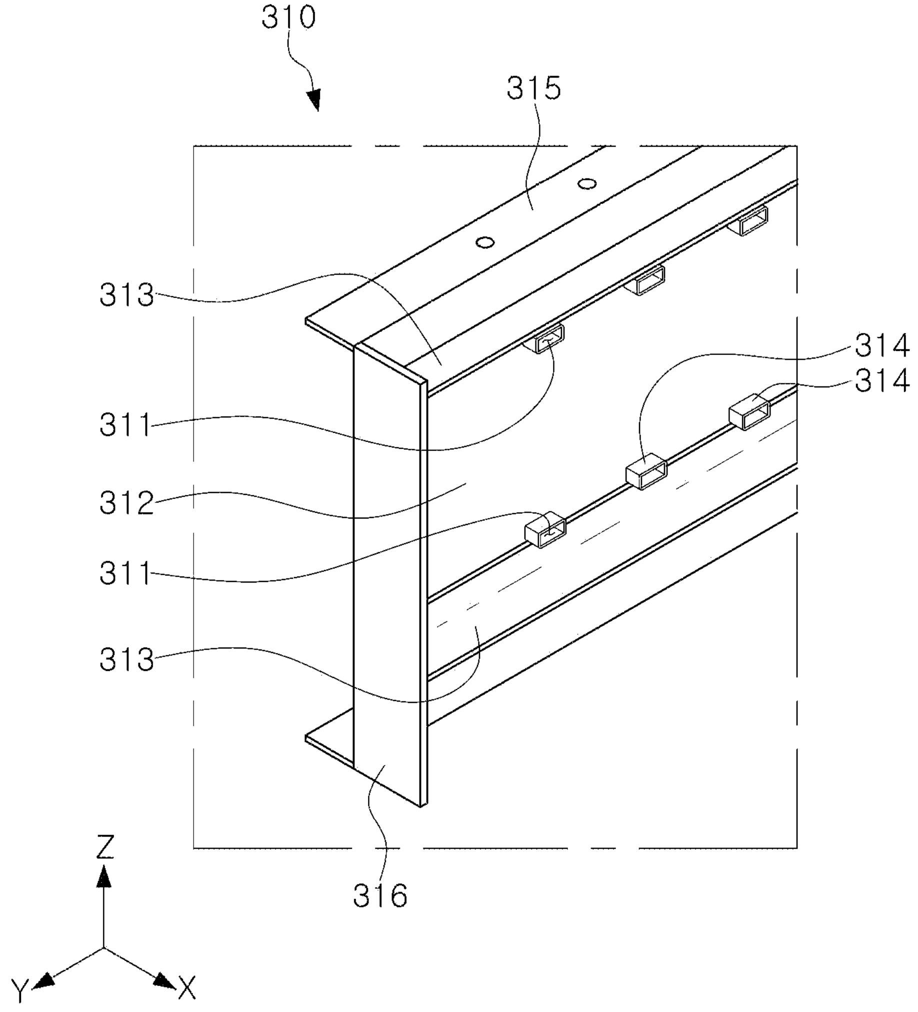
FIG. 8 is an example of a flame guiding part of a flame blocking structure according to an embodiment.
Figure 9:
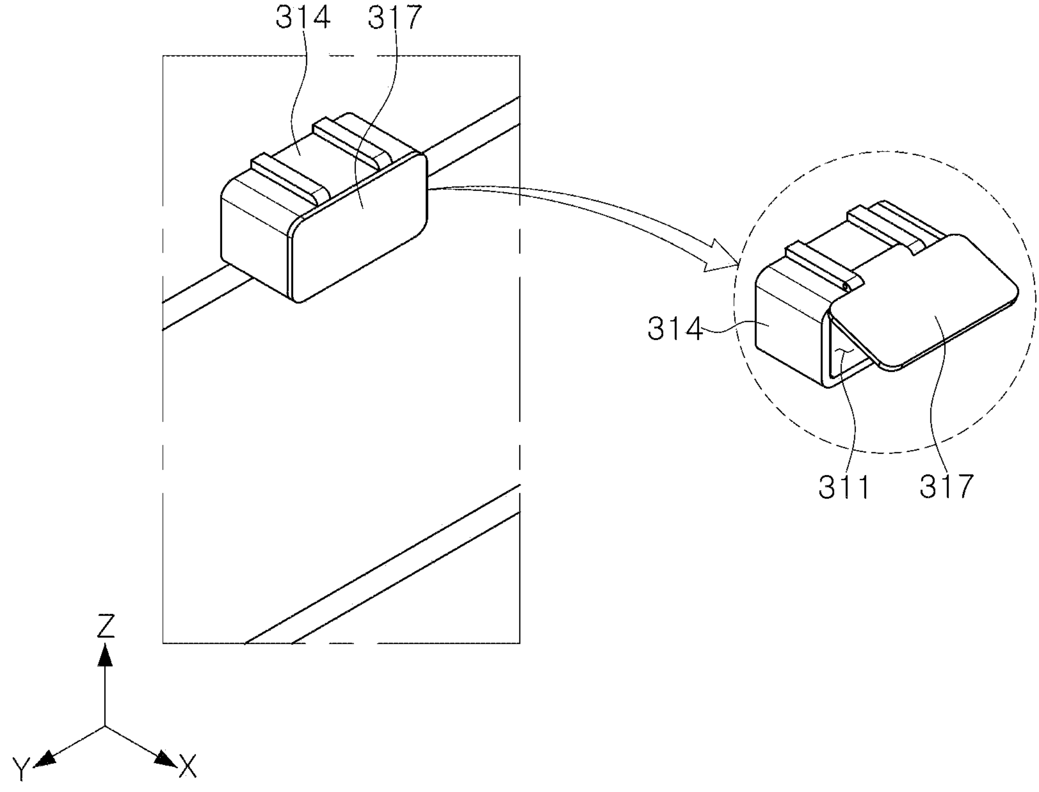
FIG. 9 is an example of a cover selectively opening an inlet hole in a flame blocking structure according to an embodiment.
Figure 10:
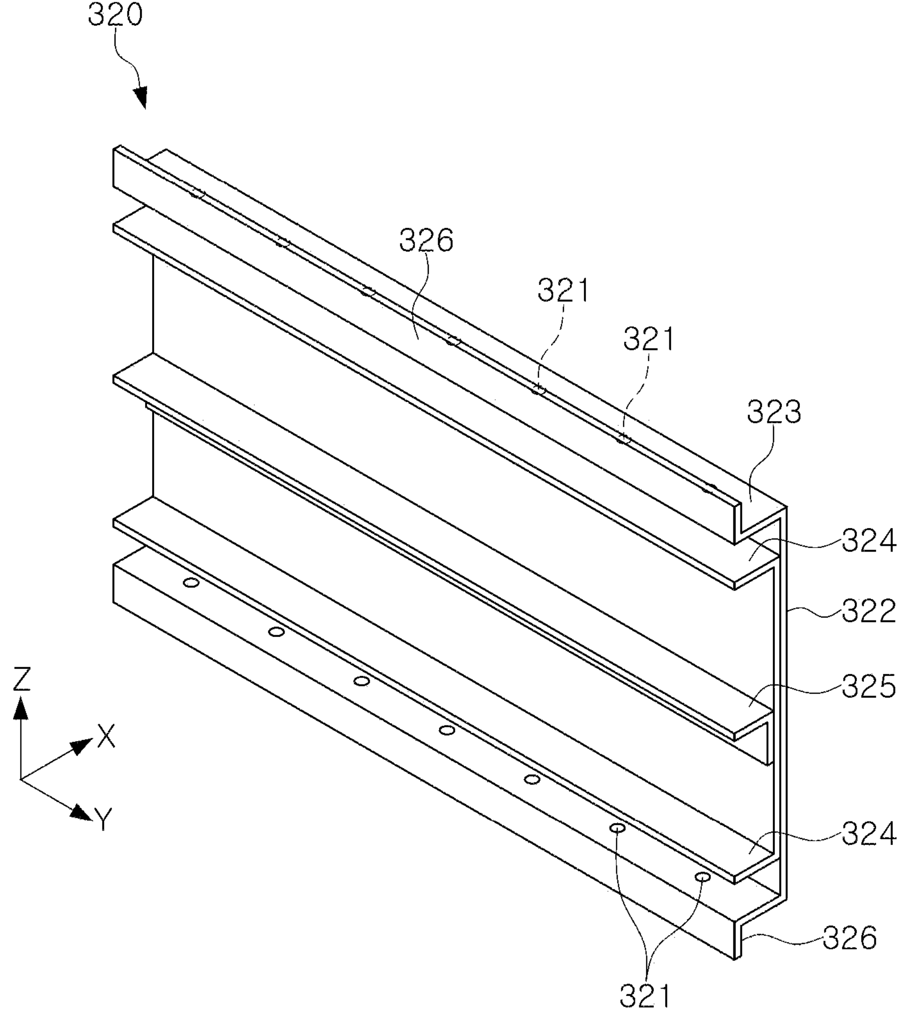
FIG. 10 is an example of a flame blocking part of a flame blocking structure according to an embodiment.

FIG. 7 is a cross-sectional view of the flame blocking structure 300 according to an embodiment. FIG. 8 is an example of the flame guiding part 310 of the flame blocking structure 300 according to an embodiment. FIG. 9 is an example of a cover 317 selectively opening the inlet hole 311 in the flame blocking structure 300 according to an embodiment. FIG. 10 is an example of the flame blocking part 320 of the flame blocking structure 300 according to an embodiment. Hereinafter, the embodiments will be described with reference to FIGS. 7 to 10.

In an embodiment, the battery module 1 may include the flame blocking structure 300. The flame blocking structure 300 may be configured such that the flame ejected from the battery assembly 200 is not discharged to the outside of the battery module 1.

Referring to FIG. 7, in an embodiment, the flame blocking structure 300 includes the inlet hole 311 through which a flame or gas ejected from the battery assembly 200 may be introduced into the inside, and the outlet hole 321 through which a flame or gas may escape to the outside of the flame blocking structure 300. The inlet hole 311 and the outlet hole 321 may have a cross section of various shapes, such as a circular shape, a slot shape or the like.

The flame or gas entering the inlet hole 311 passes through the inner chamber 330 of the flame blocking structure 300 and exits to the outlet hole 321. The inner chamber 330 of the flame blocking structure 300 is an empty space and is connected to the outside of the flame blocking structure 300 through the inlet hole 311 and the outlet hole 321.

In an embodiment, the flame blocking structure 300 may include the flame guiding part 310. The flame guiding part 310 may be coupled to one side of the battery assembly 200 and may be configured to guide the gas or flame ejected from the vent hole 113 to the inner chamber 330 of the flame blocking structure 300. The flame guiding part 310 may include the inlet hole 311 corresponding to the vent hole 113 of the battery assembly 200. One opening of the inlet hole 311 is connected to the vent hole 113, and the other opening is connected to the inner chamber 330. The flame or gas ejected from the vent hole 113 may enter the inner chamber 330 through the inlet hole 311 of the flame guiding part 310.

In an embodiment, the flame blocking structure 300 may be sealingly coupled to the battery assembly 200. For example, when the flame guiding part 310 is coupled to the battery assembly 200, there is no gap or substantially no gap between the flame blocking structure 300 and the battery assembly 200. Accordingly, all or most of the gas or flame ejected from the vent hole 113 of the battery assembly 200 exits through the inlet hole 311 of the flame guiding part 310.

The flame guiding part 310 may include a first base plate 312 facing one side of the battery assembly 200. The inlet hole 311 passes through the first base plate 312. The flame guiding part 310 may include a first flange 315 extending from the upper or lower end of the first base plate 312 to the upper or lower surface of the battery assembly 200. The first flange 315 may be sealingly coupled to the battery assembly 200. The flame guiding part 310 may include a second flange 316 extending from both ends of the first base plate 312 in the longitudinal direction (e.g., the Y direction). The second flange 316 may be sealingly coupled to the battery assembly 200. The first flange 315 and the second flange 316 may prevent a flame or gas from escaping into a gap between the flame blocking structure 300 and the battery assembly 200.

The battery assembly 200 includes the sub-packing units 100 each including at least one vent hole 113. Accordingly, the battery assembly 200 may include a plurality of vent holes 113, and the inlet hole 311 of the flame blocking structure 300 may be configured to correspond to the plurality of vent holes 113. For example, the same number of inlet holes 311 as the number of vent holes 113 formed in one side of the battery assembly 200 may be disposed in the first base plate 312.

In an embodiment, the sub-packing unit 100 may include the vent holes 113 corresponding to the upper cell accommodating portion 114*a* and the lower cell accommodating portion 114*b*, respectively. For example, gas or flames generated from the battery cell 120 disposed in the upper cell accommodating portion 114*a* is introduced into the inner chamber 330 of the flame blocking structure 300 through the first vent hole 113, and gas or flames generated from the battery cell 120 disposed in the lower cell accommodating portion 114*b* is introduced into the inner chamber 330 of the flame blocking structure 300 through the second vent hole 113.

In an embodiment, the flame guiding part 310 may include a guide pipe 314. The guide pipe 314 may define the inlet hole 311. One opening of the guide pipe 314 is connected to the vent hole 113 of the sub-packing unit 100, and the other opening is connected to the inner chamber 330. The guide pipe 314 may protrude from the first base plate 312 toward the inner chamber 330, and this configuration may prevent or significantly reduce the gas or flame introduced into the inner chamber 330 through the specific vent hole 113 from flowing into the other vent hole 113.

Referring to FIG. 9, in an embodiment, the flame guiding part 310 may include the cover 317 capable of selectively opening or closing the inner chamber 330 side opening of the inlet hole 311. When the battery cell 120 is in a normal state, the cover 317 blocks the opening of the inlet hole 311 on the inner chamber 330 side. When an event of thermal runaway occurs, the cover 317 is opened by the pressure of the gas ejected through the vent hole 113. The inlet holes 311 other than the inlet hole 311 through which the gas is introduced are blocked by the covers 317, which prevents gas or flame from flowing into the inlet hole 311 connected to the battery cell without a problem. For example, the cover 317 may be mounted on the end of the guide pipe 314. The cover 317 and the guide pipe 314 may be hinge-coupled. The cover 317 may rotate toward the inner chamber 330 based on the hinge to open or close the inner chamber 330 side opening of the guide pipe 314.

In an embodiment, the flame blocking structure 300 may include the flame blocking part 320 coupled to the flame guiding part 310. The flame blocking part 320 may be coupled to the flame guiding part 310 to define the inner chamber 330 that is an empty space. The flame blocking part 320 includes a second base plate 322 facing and spaced apart from the first base plate 312 of the flame guiding part 310, and a separation space between the first base plate 312 and the second base plate 322 may correspond to the inner chamber 330.

The outlet hole 321 may be formed in the flame blocking part 320. For example, the second base plate 322 may include an extension 323 extending from an end to the first base plate 312, and the extension 323 may define the outlet hole 321. Referring to FIG. 10, the outlet hole 321 may be provided as a plurality of outlet holes 321 in the longitudinal direction of the flame blocking part 320.

In an embodiment, the inlet hole 311 may be opened toward the inner chamber 330 in a first direction, and the outlet hole 321 may be opened from the inner chamber 330 in a second direction, intersecting the first direction. For example, referring to FIG. 7, the inlet hole 311 may be opened in the X direction, and the outlet hole 321 may be opened in the Y direction.

In an embodiment, the flame blocking structure 300 may include at least one partition wall protruding into the inner chamber 330. At least one partition wall may be disposed in the flow path between the inlet hole 311 and the outlet hole 321.

The at least one partition wall may be configured such that gas or flames ejected from the inlet hole 311 bypasses the at least one partition wall and exits to the outlet hole 321.

Referring to FIGS. 7 and 10, in an embodiment, the flame blocking part 320 may include a first partition wall 324 extending from the inner side of the second base plate 322 toward the inner chamber 330. The partition wall may be provided by a U-shaped (or square bracket (']')-shaped) beam coupled to the second base plate 322. Both ends of the beam may protrude into the inner chamber 330 to function as the first partition wall 324.

In an embodiment, the end of the first partition wall 324 may be spaced apart from the first base plate 312, and the inner chamber 330 side end of the guide pipe 314 may be spaced apart from the second base plate 322. In an embodiment, the first partition wall 324 may be disposed between the inlet hole 311 and the outlet hole 321. Accordingly, the gas (or flame) movement path from the guide pipe 314 to the outlet hole 321 becomes relatively longer by the first partition wall 324. For example, in order for the flame or gas introduced into the inner chamber 330 through the guide pipe 314 to escape through the outlet hole 321, the flame or gas should bypass the first partition wall 324, and the flame may be weakened while bypassing the first partition wall 324 and may not be exposed to the outside of the outlet hole 321.

In an embodiment, the first partition wall 324 may at least partially overlap the outlet hole 321 in the opening direction of the outlet hole 321. Referring to FIG. 7, when the outlet hole 321 is opened in the Z direction, the first partition wall 324 may be positioned in the Z direction of the outlet hole 321.

In an embodiment, the first partition wall 324 may be disposed in the flow path between the inlet hole 311 and the outlet hole 321, and may extend in parallel with the opening direction of the inlet hole 311. For example, referring to FIG. 7, the guide pipe 314 defining the inlet hole 311 protrudes from the first base plate 312 in the +X direction, and the first partition 324 may extend in the −X direction in the space between the guide pipe 314 and the extension 323.

In an embodiment, the first partition wall 324 may extend to a position closer to the first base plate 312 than the inner chamber 330 side opening of the guide pipe 314. In an embodiment, the guide pipe 314 may extend to a position closer to the second base plate 322 than the end of the first partition wall 324. For example, referring to FIG. 7, the guide pipe 314 and the first partition wall 324 may at least partially overlap each other in the Z direction.

In an embodiment, the flame blocking structure 300 may further include a second partition wall 313. The second partition wall 313 may protrude from the first base plate 312 of the flame guiding part 310 toward the inner chamber 330. The second partition wall 313 may extend into a space between the first partition wall 324 and the extension 323 of the flame blocking part 320. For example, the second partition wall 313 may extend to overlap the first partition wall 324 in the Z direction. In an embodiment, the second partition wall 313 may extend closer to the second base plate 322 than the end of the first partition wall 324.

In an embodiment, the second partition wall 313 may at least partially overlap the outlet hole 321 in the direction in which the outlet hole 321 is opened. For example, referring to FIG. 7, the second partition wall 313 may partially overlap the outlet hole 321 in the Z direction.

As the second partition wall 313 is additionally provided, the path until the flame or gas ejected from the guide pipe 314 exits through the outlet hole 321 may be relatively longer. Accordingly, the flame from being ejected to the outside of the outlet hole 321 may be more effectively prevented or significantly reduced.

In an embodiment, the flame blocking structure 300 may include a plurality of inlet holes 311. The flame blocking structure 300 may include the plurality of inlet holes 311 corresponding to the plurality of vent holes 113 disposed on one side of the battery assembly 200. In an embodiment, the flame guiding part 310 may include a plurality of guide pipes 314 defining the plurality of inlet holes 311.

In an embodiment, the inlet hole 311 may include a first inlet hole and a second inlet hole, and the flame blocking structure 300 may include a third partition wall disposed between the first inlet hole and the second inlet hole. In an embodiment, the flame blocking structure 300 may include a third partition wall 325 extending into the space between the plurality of guide pipes 314. For example, referring to FIG. 7, the third partition wall 325 may extend from the central portion of the second base plate 322 toward the first base plate 312. The third partition wall 325 may be disposed in a space between an upper outlet hole 321 and a lower outlet hole 321. For example, the third partition wall 325 may overlap the guide pipe 314 corresponding to the upper outlet hole 321 or the lower outlet hole 321 in the Z direction.

The inner chamber 330 of the flame blocking structure 300 may be divided into an upper chamber 330*a* and a lower chamber 330*b* by the third partition wall 325. An end of the third partition wall 325 is spaced apart from the first base plate 312, and the upper chamber 330*a* and the lower chamber 330*b* may be spatially connected. For example, the third partition wall 325 may be provided as a portion of a beam having a 90 degree angle coupled to the second base plate 322. Although not illustrated, in another embodiment, the third partition wall 325 may extend from the first base plate 312 toward the second base plate 322.

The third partition wall 325 may prevent the flame or gas entering the upper chamber 330*a* from passing into the lower chamber 330*b* or the flame or gas entering the lower chamber 330*b* from passing into the upper chamber 330*a*. Accordingly, the third partition wall 325 may significantly reduce an effect of an event such as thermal runaway occurring in the upper battery cell 121 on the lower battery cell 122 or an effect of an event occurring in the lower battery cell 122 on the upper battery cell 121.

In the illustrated embodiment, the third partition wall 325 is provided in a form that traverses between upper inlet holes 311*a* and lower inlet holes 311*b*, but this is only an example, and alternatively or additionally, the third partition wall 325 may be provided to traverse between the upper inlet holes 311*a*. For example, referring to FIG. 8, the upper inlet holes 311*a* are arranged in the Y direction, and the third partition wall 325 may extend into a space between the upper inlet holes 311*a*.

In an embodiment, the size of the vent hole 113 and the size of the outlet hole 321 of the flame blocking structure 300 may have a predetermined relationship. For example, the ratio of the size of the outlet hole 321 to the size of the vent hole 113 may have a value between 2 and 4. The size of the vent hole 113 or the outlet hole 321 indicates an area viewed in the moving direction of a fluid passing through the vent hole 113 or the outlet hole 321.

In an embodiment, the volume of the inner chamber 330 may have a value between 1.5 and 2.5 times the volume of the unit battery cell. Since the volume of the inner chamber 330 is reduced due to debris flowing into the inner chamber 330 when an event occurs, the flame blocking structure 300 in which the volume of the inner chamber 330 is less than approximately 1.5 times the volume of the unit battery cell may not be able to properly shut off the flame. Since it is very important to increase the energy density in the battery field, the flame blocking structure 300 may be configured such that the volume of the inner chamber 330 is less than approximately 2.5 times the volume of the unit battery cell.

The partition walls 324, 325 and 312 described in this specification are merely examples, and additional partition walls having a similar shape may be disposed in the inner chamber 330.

As set forth above, the battery module according to an embodiment may be configured such that a flame generated internally is not ejected to the outside, which may prevent the transfer of fire to neighboring battery modules and prevent damage to an object outside the battery module.

While embodiments have been illustrated and described above, it will be apparent to those skilled in the art that modifications and variations could be made without departing from the scope of the present disclosure as defined by the appended claims.

What is claimed is:

1. A battery module comprising:

a battery assembly including a plurality of sub-packing units, each of the plurality of sub-packing units includes a cell housing, battery cells accommodated in an internal space of the cell housing, and at least one vent hole disposed in the cell housing and connecting the internal space to an outside of the cell housing; and a flame blocking structure coupled to the battery assembly, and including an inlet hole connected and corresponding to the at least one vent hole, an inner chamber communicating with the inlet hole, an outlet hole communicating with the inner chamber and the outside, and at least one partition wall protruding into the inner chamber, wherein the at least one partition wall is disposed in a flow path between the inlet hole and the outlet hole, and the at least one partition wall at least partially overlaps the outlet hole, wherein the cell housing includes a support member configured to accommodate the battery cells, and a case coupled to the support member, wherein the at least one vent hole is disposed in the support member, wherein the flame blocking structure includes a flame guiding part sealingly coupled to one side of the battery assembly and including the inlet hole, and a flame blocking part coupled to the flame guiding part to define the inner chamber and including the outlet hole, wherein the at least one vent hole is formed in a side surface of the battery assembly, the flame guiding part includes a first base plate covering the side surface, and the inlet hole penetrates through a portion of the first base plate corresponding to the at least one vent hole formed in the side surface of the battery assembly, wherein the flame guiding part includes a pipe defining the inlet hole and further protruding from the first base plate toward the inner chamber, and wherein the support member includes a cell accommodating portion opened in both directions, and the case is coupled to the support member to cover the opened region of the cell accommodating portion so as to surround the battery cells, and the case presses the battery cells inward.

2. The battery module of claim 1, wherein the at least one partition wall is configured such that gas or a flame ejected from the inlet hole bypasses the at least one partition wall and exits to the outlet hole.

3. The battery module of claim 1, wherein the inlet hole is opened in a first direction toward the inner chamber, and the outlet hole is opened from the inner chamber in a second direction, intersecting the first direction.

4. The battery module of claim 3, wherein the at least one partition wall at least partially overlaps the outlet hole in the second direction.

5. The battery module of claim 3, wherein the at least one partition wall extends in the first direction.

6. The battery module of claim 1, wherein the flame blocking structure is sealingly coupled to the battery assembly, and the at least one vent hole communicates with the inner chamber through the inlet hole.

7. The battery module of claim 1, wherein the flame blocking part comprises a second base plate spaced apart from the first base plate, and an extension portion extending from an end of the second base plate to the first base plate and defining the outlet hole.

8. The battery module of claim 7, wherein the at least one partition wall extends from the second base plate to the first base plate and includes a first partition wall disposed between the inlet hole and the outlet hole.

9. The battery module of claim 8, wherein the flame guiding part includes a second partition wall extending from the first base plate to the second base plate and disposed between the extension portion and the first partition wall.

10. The battery module of claim 9, wherein the second partition wall extends closer to the second base plate than an end of the first partition wall.

11. The battery module of claim 1, wherein the inlet hole includes a first inlet hole and a second inlet hole, and the at least one partition wall includes a third partition wall disposed between the first inlet hole and the second inlet hole.

12. The battery module of claim 11, wherein the internal space of the cell housing includes a first cell accommodating portion accommodating a first portion of the battery cells and a second cell accommodating portion separated from the first cell accommodating portion and accommodating a second portion of the battery cells, the at least one vent hole includes a first vent hole communicating with the first cell accommodating portion and a second vent hole communicating with the second cell accommodating portion, and the first inlet hole communicates with the first vent hole, and the second inlet hole communicates with the second vent hole.

13. The battery module of claim 1, wherein the flame blocking structure includes a cover configured to selectively open or close the inlet hole.

14. The battery module of claim 1, wherein a volume of the inner chamber is 1.5 to 2.5 times a volume of one of the battery cells accommodated in the internal space of the cell housing.

15. The battery module of claim 1, wherein a size of the outlet hole is 2 to 4 times a size of one of the at least one vent hole.

16. A battery module comprising:

a battery assembly including a plurality of sub-packing units, each of the plurality of sub-packing units includes a cell housing, battery cells accommodated in an internal space of the cell housing, and at least one vent hole disposed in the cell housing and connecting the internal space to an outside of the cell housing; and a flame blocking structure coupled to the battery assembly, and including an inlet hole connected and corresponding to the at least one vent hole, an inner chamber communicating with the inlet hole, an outlet hole communicating with the inner chamber and the outside, and at least one partition wall protruding into the inner chamber, wherein the at least one partition wall is disposed in a flow path between the inlet hole and the outlet hole, and the at least one partition wall at least partially overlaps the outlet hole, wherein the cell housing includes a support member configured to accommodate the battery cells, and a case coupled to the support member, wherein the at least one vent hole is disposed in the support member, wherein the flame blocking structure includes a flame guiding part sealingly coupled to one side of the battery assembly and including the inlet hole, and a flame blocking part coupled to the flame guiding part to define the inner chamber and including the outlet hole, wherein the at least one vent hole is formed in a side surface of the battery assembly, the flame guiding part includes a first base plate covering the side surface, and the inlet hole penetrates through a portion of the first base plate corresponding to the at least one vent hole formed in the side surface of the battery assembly, and wherein the flame guiding part includes a pipe defining the inlet hole and further protruding from the first base plate toward the inner chamber.

17. A battery module comprising:

a battery assembly including a plurality of sub-packing units, each of the plurality of sub-packing units includes a cell housing, battery cells accommodated in an internal space of the cell housing, and at least one vent hole disposed in the cell housing and connecting the internal space to an outside of the cell housing; and a flame blocking structure coupled to the battery assembly, and including an inlet hole connected and corresponding to the at least one vent hole, an inner chamber communicating with the inlet hole, an outlet hole communicating with the inner chamber and the outside, and at least one partition wall protruding into the inner chamber, wherein the at least one partition wall is disposed in a flow path between the inlet hole and the outlet hole, and the at least one partition wall at least partially overlaps the outlet hole, wherein the cell housing includes a support member configured to accommodate the battery cells, and a case coupled to the support member, wherein the at least one vent hole is disposed in the support member, wherein the flame blocking structure includes a flame guiding part sealingly coupled to one side of the battery assembly and including the inlet hole, and a flame blocking part coupled to the flame guiding part to define the inner chamber and including the outlet hole, wherein the at least one vent hole is formed in a side surface of the battery assembly, the flame guiding part includes a first base plate covering the side surface, and the inlet hole penetrates through a portion of the first base plate corresponding to the at least one vent hole formed in the side surface of the battery assembly, wherein the flame blocking part comprises a second base plate spaced apart from the first base plate, and an extension portion extending from an end of the second base plate to the first base plate and defining the outlet hole, wherein the at least one partition wall extends from the second base plate to the first base plate and includes a first partition wall disposed between the inlet hole and the outlet hole, wherein the flame guiding part includes a pipe defining the inlet hole and further protruding from the first base plate toward the inner chamber, and wherein the first partition wall extends closer to the first base plate than an opening of the pipe in an inner chamber side.

* * * * *